United States Patent [19]
Yang et al.

[11] Patent Number: 6,015,512
[45] Date of Patent: Jan. 18, 2000

[54] EXTRUSION-COMPRESSION MOLDING OF OPTICAL ARTICLES

[75] Inventors: Zhou Yang; Yin-Nian Lin, both of Milford, Conn.

[73] Assignee: Optima Inc., Stratford, Conn.

[21] Appl. No.: 09/014,811

[22] Filed: Jan. 28, 1998

[51] Int. Cl.[7] .................................................. B29D 11/00
[52] U.S. Cl. .................... 264/2.2; 264/297.7; 264/297.8; 425/347; 425/411; 425/412; 425/447; 425/808
[58] Field of Search ..................................... 264/1.1, 1.36, 264/2.2, 2.3, 2.5, 297.6, 297.7, 297.8; 425/808, 412, 347, 411, 348 R, 447, 449

[56] References Cited

U.S. PATENT DOCUMENTS

| | | |
|---|---|---|
| 4,008,031 | 2/1977 | Weber . |
| 4,091,057 | 5/1978 | Weber . |
| 4,254,065 | 3/1981 | Ratkowski . |
| 4,364,878 | 12/1982 | Laliberte et al. . |
| 4,409,169 | 10/1983 | Bartholdsten et al. . |
| 4,442,061 | 4/1984 | Matsuda et al. . |
| 4,519,763 | 5/1985 | Matsuda et al. . |
| 4,540,534 | 9/1985 | Grendol . |
| 4,627,809 | 12/1986 | Okabayashi et al. . |
| 4,707,321 | 11/1987 | Segawa et al. . |
| 4,786,444 | 11/1988 | Hwang ................................... 264/1.36 |
| 4,828,769 | 5/1989 | Maus et al. . |
| 4,836,960 | 6/1989 | Spector et al. ............................ 264/2.2 |
| 4,933,119 | 6/1990 | Weymouth, Jr. .......................... 264/2.2 |
| 5,264,160 | 11/1993 | Arai et al. ............................... 264/1.38 |
| 5,275,637 | 1/1994 | Sato et al. ................................. 264/1.1 |
| 5,700,307 | 12/1997 | Kashiwagi et al. . |

FOREIGN PATENT DOCUMENTS

0130769 B1   4/1988   European Pat. Off. .

*Primary Examiner*—Mathieu D. Vargot
*Attorney, Agent, or Firm*—DeLio & Peterson, LLC

[57] ABSTRACT

An extrusion-compression molding process is provided for making optical articles wherein a melt shot of optical polymer extrudate is fed to sequentially moving lower dies of a die set including a lower die and an upper die and then the upper die positioned on top of the melt shot containing lower die and the die set compressed forming the optical article. After the optical article is formed, the lower die and upper die are separated and recycled for forming additional optical articles. The optical polymeric material may be in the form of pellets and melted in an extruder. A reaction extruder may also be employed where the optical polymeric material is produced in the reaction extruder from optical polymer monomers. A shuttle carriage is preferably used to transport the lower die, melt shot containing lower die and melt shot containing die set through the steps of the molding process. A control system is used to obtain input data and generate output signals to monitor and control the process steps.

26 Claims, 2 Drawing Sheets

EXTRUSION-COMPRESSION MOLDING OF OPTICAL ARTICLES

BACKGROUND OF THE INVENTION

1. Field of the Invention

The present invention relates to making optical articles such as opthalmic lenses by molding and, in particular, to using a continuous extrusion-compression molding method to make plastic lenses whereby a polymer melt is fed from an extruder or melting apparatus to a series of sequentially processed compression molds, the lenses formed by compressing the molds, the lenses separated from the molds and the molds recycled to the melt feed step of the process.

2. Description of Related Art

Direct compression molding of thermoplastic and thermoset polymers to make plastic optical articles such as lenses has been used for years. Basically, the compression molding process uses a packed powder or a pre-form material and the article is formed by adding the material to a mold, closing the mold and pressing the mold at an elevated temperature. The mold typically consists of a lower mold and an upper mold forming a mold or die set. In a thermoplastic lens manufacture molding process, the material and the mold are heated to a predetermined temperature to soften the material and a compressive force applied to the mold for a predetermined time to reach a predetermined cavity size with excess material being squeezed out of the mold. The mold is then cooled and opened and the article removed from the mold. This method, however, is not commercially attractive because it has a long cycle time, poor energy efficiency and it is economically less beneficial compared with an injection molding process. A direct injection molding process, in general, is a faster and more efficient method for molding thermoplastic materials.

In molding such optical articles as a negative powered Rx lense, however, conventional injection molding methods have a number of serious operational problems. These type lenses have a cross section in which the center is thinner than the edge and this feature makes direct injection molding very difficult especially when the viscosity of the melt is high. In general, the melt injected into the mold tends to fill the edge of the mold first due to less resistance in the thicker section of the mold cavity and after filling much of the edge area, the melt redirects itself to the center thinner area of the mold cavity. The mold used in an injection molding process has to be relatively cold due to the need for shortening the cycle time and when the melt meets in the center area a knit line is often formed. This phenomenon is especially serious when molding a lens with thinner center thickness which has higher volume due to its lighter weight. In addition, injection molding typically introduces orientation induced stress and birefringence. Lack of sufficient packing force used in cold runner injection molding technology often results in uneven shrinkage related lens pre-release and causes line marks on the lens surface. These type problems have to be avoided for the article to be suitable for optical uses.

To overcome some of the above problems, injection-compression molding technology has been developed as shown in U.S. Pat. Nos. 4,008,031; 4,091,057; 4,254,065; 4,364,878; 4,409,169; 4,442,061; 4,519,763; 4,540,534; 4,627,809; 4,707,321; 4,828,769; and European Patent Publication 0130769, which patents are hereby incorporated by reference. Generally, a shot of melt is injected into a separated mold using an injection molding machine. The mold is then closed to apply a compressive force to the melt and packs the mold cavity by hydraulic clamping or from an auxiliary component such as springs. The timing for the injection and compression steps, melt shot size and temperature control of the mold are all critical operational factors. In many cases, hot runner technology has to be used to gain sufficient packing force.

Even though there are different versions of the injection-compression molding technology, they are more or less similar to each other and this technology has certain drawbacks. For one, the process often produces a product having some stress and birefringence possibly due to the large temperature difference between the mold and the melt. Additionally, the cycle time is often very long because filling of the mold is a slow process and in some improved methods, the mold has to be heated and cooled in every cycle. The use of hot runner technology increases the time the material is exposed to high temperatures and a heat sensitive material may be adversely affected. The cost of the mold is also extremely high and the controlling system to coordinate the injection and compression steps is critical and often very complicated and expensive.

Many polymeric materials are compounded in an extruder by adding to the extruder the polymer in the form of pellets and additives. Some specialized optical materials such as thiourethane and urethane polymers and/or copolymers are made in reaction extruders by adding the polymer reactants to the extruder. When molding an article, the pellets may also be heated in a molding machine and fused into a melt or softened to facilitate the molding process. Typically, however, plastic materials are prone to decomposition at high temperatures and/or in a long heating process. There is also generally a direct relationship between the optical and mechanical properties of polymer lenses and how many times and how long the polymer has been fused, especially for heat sensitive materials. Normally, materials formed into optical articles need to have a thermal history as short as possible, otherwise, increased yellowing, oxidation of the polymer and deteriorated mechanical properties may result. Also from an energy efficiency point of view, re-heating plastic pellets to a molten form is not economically nor environmentally attractive. One of the difficulties of utilizing the melt from an extruder directly as a feeding source to the molding machine is that extrusion is typically a continuous process and the conventional injection molding, injection-compression molding, and compression molding methods are all batch or intermittent processes. To couple a continuous extruder with an intermittent or batch molding machine presents a formidable burden which has not been solved by the art.

Bearing in mind the problems and deficiencies of the prior art, it is an object of the present invention to provide a method of molding polymers, particularly thermoplastic materials, into optical articles such as Rx lenses using an extruder or other apparatus to form a polymer melt and to compression mold the melt to form optical articles without commercially unacceptable defects such as a knit line, stress, birefringence and pre-release marks.

It is another object of the present invention to provide a method which is energy efficient and has reduced thermal processing time whereby an extruded melt is used directly from a reaction extrusion process to mold an optical article without the additional steps of making pellets and then fusing the pellets to mold the article.

In another object of the invention, a method is provided for the use of pelletized thermoplastic materials to make optical articles.

It is a further object of the present invention to provide a method whereby an extruder or a reaction extruder and compression molding of a die set comprising at least two die sections are used in sequence to make optical articles such as lenses.

Another object of the invention is to provide an apparatus for making optical articles such as lenses.

In another object of the invention, optical articles made using the method and apparatus of the invention are also provided.

Still other objects and advantages of the invention will be obvious in part from the specification.

SUMMARY OF THE INVENTION

This invention is directed in one aspect to an extrusion-compression (E-C) molding process which is a sequential series of steps comprising an extrusion or melting step to form a melt of a polymer material, which melt is formed into an optical article by feeding the melt into sequentially processed molds, compressing the filled molds and separating the optical article from the mold and recycling the mold for reuse to form additional optical articles. The invention in another aspect includes a molding method for molding both heat sensitive thermoplastic optical materials and conventional thermoplastic optical materials. The materials include, but are not limited to, optical thermoplastic thiourethane-urethane copolymers (as described in U.S. Pat. No. 5,679,756), polystyrene, acrylic polymers, polycarbonate, and SAN. As will be appreciated by those skilled in the field, a small amount of crosslinking agent(s) may be used in the extrusion (melt) and the molded article will not be completely re-fusible. The term thermoplastic used herein includes such polymers containing small amounts of cross-linking agents.

In another aspect of the invention, a method of forming an optical article is provided comprising:

forming a melt of an optical polymeric material;

providing a lower die from a lower die supply device, the lower die being part of a die set comprising a lower die and an upper die;

adding a portion of the melt to the upper surface of the lower die;

providing the upper die from an upper die supply device and positioning the upper die on top of the melt containing lower die forming a melt containing die set;

compressing the melt containing die set forming an optical article;

removing the optical article from the die set; and repeating the above steps until the desired number of optical articles are made.

An extruder used in the process can be a twin screw intermeshing, non-intermeshing or combination of twin screw and a single screw extruder or a single screw extruder or any other suitable extruder. The melt formed by the extruder or other melting apparatus is fed to a lower die of a mold die set which lower die is transported in a die shuttle carriage in the method. The top die of the die set is then positioned on top of the filled lower die forming a polymer containing die set in the shuttle carriage which is then positioned under a press. The polymer containing die set is pressed using a predetermined pressure preferably 10–2,000 psi. The thickness of the formed optical article is typically determined by a pre-set cavity gap between the upper die and lower die. The die set is not mechanically connected to the extruder and the die set is preferably detachable from the shuttle carriage and the press. The die surface may be pre-treated with releasing agents.

The individual lower and upper dies of the die set and the shuttle carriage are preferably heated and more preferably to a temperature higher than the Tg of the polymer and lower than the decomposition temperature of the polymer. The temperature of the die set and the shuttle carriage is preferably between 20° C. higher than the Tg to 10° C. lower than the decomposition temperature of the polymer. The elevated temperature of the die set used in this method and preferably also the die carriage is an important feature of the invention which is to be compared and contrasted with injection molding and injection-compression molding processes where the mold is essentially cold when the melt is forced into the mold. It has been found that the higher die set temperature enables the polymer to more effectively copy the surface features of the die and provides commercially acceptable optical articles.

After the die set is pressed to the predetermined position and cavity gap width, the pressed position is held for an effective time to solidify the polymer, e.g., 2–30 sec. The die set is then removed from the press and then from the shuttle carriage. The shuttle carriage is recycled to the lower die feed step and a lower die fed to the carriage. The die set with the molded part therein is typically post treated, e.g., maintained at a temperature about 2° C. to 80° C. higher than the Tg of the material and below the decomposition temperature of the optical article. The die set is preferably closed during post treatment. A number of different post treatments can be performed according to the properties of the material. The die set can be closed and the temperature of the die maintained by heating to allow annealing of the article to eliminate any stress and birefringence without deforming the shape of the article. In another option, the temperature can be gradually lowered to a temperature below the Tg, e.g., room temperature, and the die set opened to release the molded article.

In another aspect of the invention, the method is particularly useful for use with a reaction extrusion system, especially for a heat sensitive polymer made by the system. For example, the monomers and/or prepolymers are polymerized in the reaction extruder and the polymer melt is continuously extruded. The extruded melt is molded directly instead of being made into pellets which pellets must be fed into a molding machine such as an injection molding machine and reheated to mold the article. The E-C molding process of the invention is energy efficient and produces an article having enhanced optical properties.

In another aspect of the invention, the method uses a pelletized polymeric material such as polystyrene, PMMA, polycarbonate, SAN, etc. The polymer is melted and the melt extruded for a subsequent compression molding process according to the invention as described hereinabove. The same steps above of eliminating any stress and birefringence and preventing deformation in the molding process can also be achieved with pelletized materials in the molding process of the invention.

In an additional aspect of the invention, an apparatus for making optical articles is provided comprising:

melting means for forming a melt of an optical polymeric material;

lower die supply means for supplying a lower die to receive a portion of the melt;

melt supply means for feeding the melt to the upper surface of the lower die;

upper die supply means for supplying an upper die and positioning the upper die on top of the melt containing lower die forming a melt containing die set;

compression means for compressing the melt containing die set to form the optical article;

separating means for separating the formed optical article from the upper die and lower die; and recycling means to transport the lower die and upper die to their respective supply means.

The economic advantages of the E-C process for lenses are increased because the shape of the article made in this process is relatively simple and has geometrical symmetry. Inexpensive dies such as glass dies may be utilized and are preferred to comprise the lower die and upper die forming the die set. This is important because a plurality of die sets are used in sequence in the process instead of only one mold as in a typical intermittent process such as in an injection molding or an injection-compression molding process. Glass dies are suitable for use in the subject process since the process uses relatively high temperatures and a relatively low molding pressure. The capability of using glass dies is an important feature of the invention since the glass die surface can be more easily processed into optical grade smoothness than a metal die surface.

Any suitable press may be used in the process and the production rate of the process is high because of the sequential multiple die set operation.

BRIEF DESCRIPTION OF THE DRAWINGS

The features of the invention believed to be novel and the elements characteristic of the invention are set forth with particularity in the appended claims. The figures are for illustration purposes only and are not drawn to scale. the invention itself, however, both as to organization and method of operation, may best be understood by reference to the detailed description which follows taken in conjunction with the accompanying drawings in which:

DESCRIPTION OF THE PREFERRED EMBODIMENT(S)

Figure 1:
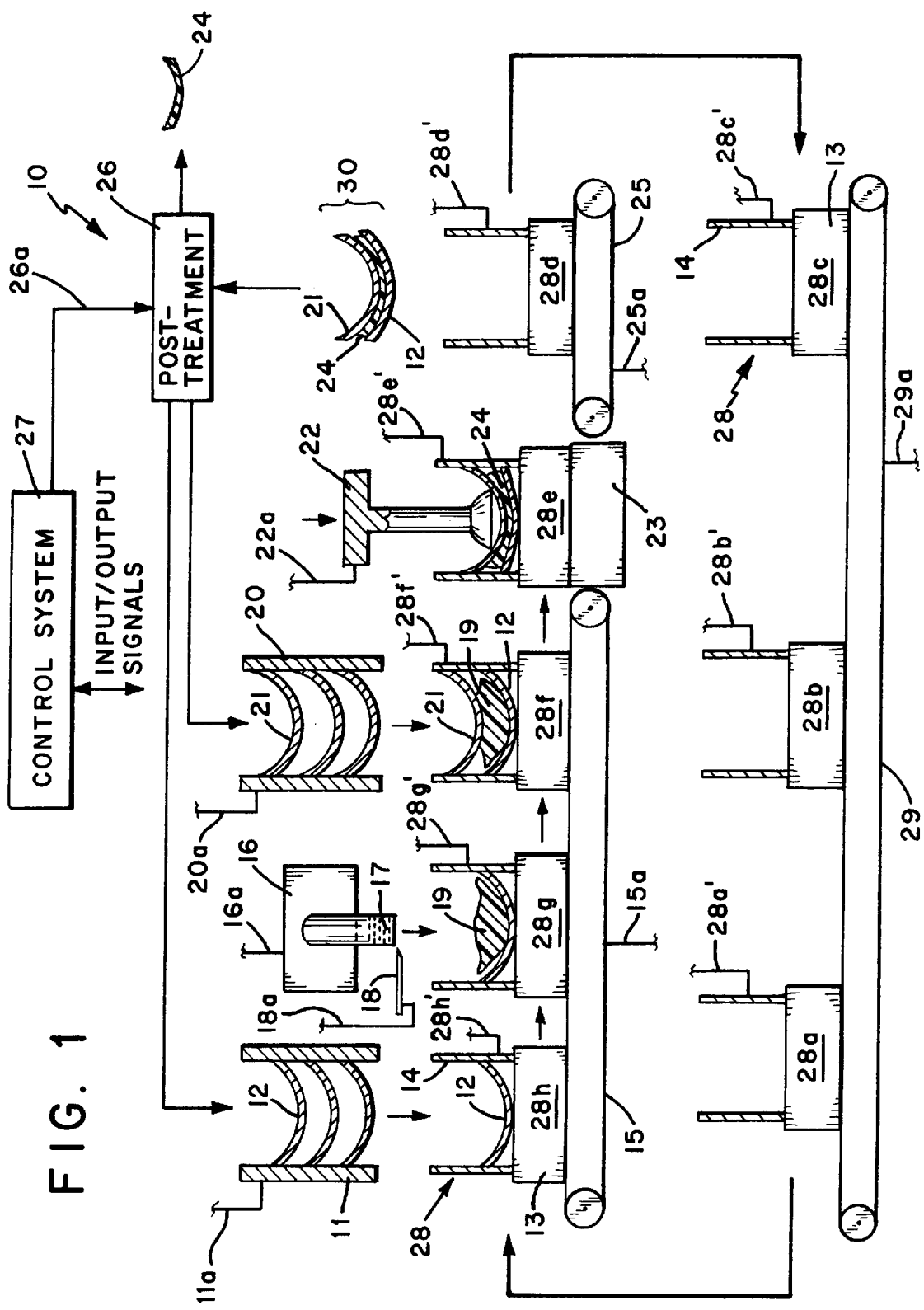
FIG. 1 is a schematic diagram of a method of the invention used to make optical lenses.

In describing the preferred embodiment of the present invention, reference will be made herein to FIGS. 1–2 of the drawings in which like numerals refer to like features of the invention. Features of the invention are not necessarily shown to scale in the drawings.

The extruders used in this invention can be any type such as a twin screw intermeshing, non-intermeshing or combination of twin screw and a single screw extruder or a single screw extruder. An extruder may be defined as an apparatus wherein a polymer is heated and plasticized and a portion of the melt used to fill a mold, typically by forcing the melt through an opening of the apparatus. The ratio of length/diameter (L/D) of the extruder can be up to 140 or more depending upon the material to be processed. In a reaction extrusion system, a twin screw extruder is preferred and an L/D ratio of 32 to 140 is preferred with a ratio of 36 to 100 being more preferred depending upon different reaction systems. For plasticizing polymeric materials, both a twin screw and a single screw extruder can be used and an L/D ratio of 20 to 80 is preferred and 20 to 56 is more preferred. A heater may also be used to form a melt and the melt fed to the mold by conventional means in the same manner as from an extruder.

The extruder is preferred to have one to five feeding ports and one to five venting ports. The temperature and screw speed of the extruder are set at the normal operation range of the parameters for the material extrusion process in order to produce a melt with a viscosity generally in the range of 1,000 to 300,000 cps or more depending upon the material. A screen changer is typically installed on the extruder for filtering the melt. The melt is extruded to minimize air bubbles, voids or visible inclusions in the extruded melt.

An E-C molding process of the invention is shown in FIG. 1 generally as 10. A die shuttle carriage shown generally as 28 is preferably heated to a temperature of between 20° C. higher than the Tg to 10° C. lower than the decomposition temperature of the polymer to be processed. Sequentially processed shuttle carriages 28a, 28b, 28c, 28d, 28e, 28f, 28g and 28h are shown being employed in the process. Thus, while carriage 28h is being fed a lower die 12, from lower die supply means 11 preceding sequential carriage 28g is shown receiving melt shot 19. The die shuttle carriage 28h is shown being loaded from lower die holder 11 with a lower die 12 of a die set which comprises a lower die 12 and an upper die 21. The lower die 12 is preferably heated to a temperature of between 20° C. higher than the Tg to 100° C. lower than the decomposition temperature of the material to be processed. In order for the lower die 12 to be properly positioned, a vertical mechanical guide 14 is used on base 13 of shuttle carriage 28 and the lower die 12 is slid along the guide 14 into position at the top of the base. The die shuttle carriage 28h with the lower die 12 is carried by conveyor 15. Preceding carriage 28g is shown positioned under the opening of an extruder 16 to collect a melt shot 19 from extrudate (melt strand) 17. When the predetermined amount of the melt strand (extrudate) 17 is determined, the melt strand (extrudate) is cut by an automatic cutting apparatus 18 forming a set amount of melt (mold shot 19). The time to discharge the melt from the extruder to the lower die is in the range of 1–20 seconds and preferably 1–10 seconds. A shorter time is preferred for enhanced polymer properties, e.g., reducing the possibility of polymer oxidation, etc. The die shuttle carriage 28g would then be moved to the next position by conveyor 15. Preceding carriage 28f is shown being bed an upper die 21 from upper die holder 20 and on the top of melt shot 19 by sliding the upper die along mechanical guide 14. The upper die 21 is also preferably at a temperature of between 20° C. higher than the Tg to 10° C. lower than the decomposition temperature of the material to be processed.

The shuttle carriage 28f with the lower and upper dies filled with the melt shot 19 would then be moved to station 23. Preceding carriage 28e is shown under a hydraulic press 22 and pressure applied from the press head by contacting the press with the upper die 21. The pressure can range from 10 to 2,000 psi or more. The preferred pressure is 10–1,000 psi. The most preferred pressure is 10–500 psi and the gap width between the die halves determines the thickness of the article to be made. The gap is controlled by a mechanical spacer measuring the gap width at the edge of the die or by an optical device such as a laser micrometer which will stop the press electrically once the upper die 21 is pressed to the predetermined position. Sensor means 28e' is used to input gap and other data to control system 27. More than one press can be used to match the production rate of the extruder and the number of shuttle carriage and die sets used.

After the die set is pressed to the predetermined position and held in a pressurized position for about 2–30 sec., the shuttle carriage 28e containing formed article die set would then be moved to second conveyor 25. The preceding carriage 28d is shown wherein the polymer containing die set shown in composite as 30 is removed from the shuttle carrier 28d. Shuttle carriage 28d would then be moved along third conveyor 29 with carriages 28c, 28b and 28a for reuse at the start of the process.

The polymer containing die set 30 is maintained at a temperature 2° C. to 80° C. higher than the Tg of the material during post-treatment in step 26. The die set is preferably kept closed during post-treatment. A number of different post-treatments can be employed according to the properties of the polymer and/or the requirements of the article. For example, the polymer containing die set 30 may be kept closed and the temperature of the die maintained by heating the die set to allow annealing of the formed article therein to complete the polymerization or to eliminate any stress and birefringence without deforming the shape of the article. The polymer containing die set may also be allowed to gradually cool and then opened to release the formed article. The optical article (lenses) 24 is removed from the die set and the lower die 12 and upper die 21 transferred to their respective die holders 11 and 20.

In an important feature of the invention, the extruder 16 is controlled to feed a melt shot 19 to a plurality of shuttle carriages advancing through the process in sequence without interruption except for cutting of the melt extrudate strand 17. The melt is preferably collected on the lower die surface so that the contact area of the melt and die is as small as possible at the beginning of the feeding and gradually the area of the melt is increased over the die area with no appreciable voids or bubbles being trapped in the contact area. To achieve such a flow pattern, the contour of the extrudate nozzle and the shape of the extruder die opening preferably forms a vertically falling melt strand 17 having a circular cross section with a round tipped bottom side formed by gravity acting on the melt strand. The temperature and cross-section of the melt strand are specially controlled to form such a melt strand shape. The tipped bottom of the melt will contact the surface of the lower die first. When the melt strand is settling to cover the lower die surface, the contact area between the melt strand and the surface of the die increases by spreading outwards along the die surface and no voids or air bubbles are trapped inside of the contact area. The distance the extrudate (melt strand) moves before contacting the die surface is generally about 2 to about 6 inches, preferably 3–5 inches. The upper die is added (placed) on top of the melt shot 19 and when the pressing force is urged onto the upper die, the contact area between the melt and the die surface continuously increases by spreading outwards toward the lower die and upper die edges. Bubbles and voids are avoided using this technique. Increasing the compression path is helpful for improving the quality of the molded article and it is a preferred feature of the invention that the cross section of the melt strand be circular and the diameter of the circle be as large as possible with the proviso that the quantity of the melt added to the die be only slightly more than the quantity needed for making the article. The excess amount of the melt is about 1 to 10% weight of the article but may be larger depending on the polymer used, etc. The broken ends of the melt strand may be cooler than the rest of the melt. When the melt is fed into the die, the ends of the strand are preferably placed closer to the edge of the die as part of the scrap otherwise defects may occur. The ends can also be used to mold a handle of a lens which is useful in a subsequent coating process and then removed after coating.

A nitrogen atmosphere blanket or other inert gas may be used in the process, if necessary, to protect the polymer from oxygen and moisture.

Control system 27 obtains input/output data 11a, 15a, 16a, 18a, 20a, 22a, 25a, 26a, 28a'–28h' and 29a and uses the data to control the process. For example, data 28h' is typically that the lower die 12 is properly positioned in shuttle carriage 28h, and the temperature of the shuttle carriage 28h and lower die 12. Data input 11a typically indicates if lower dies 12 are present in lower die holder 11.

Figure 2:
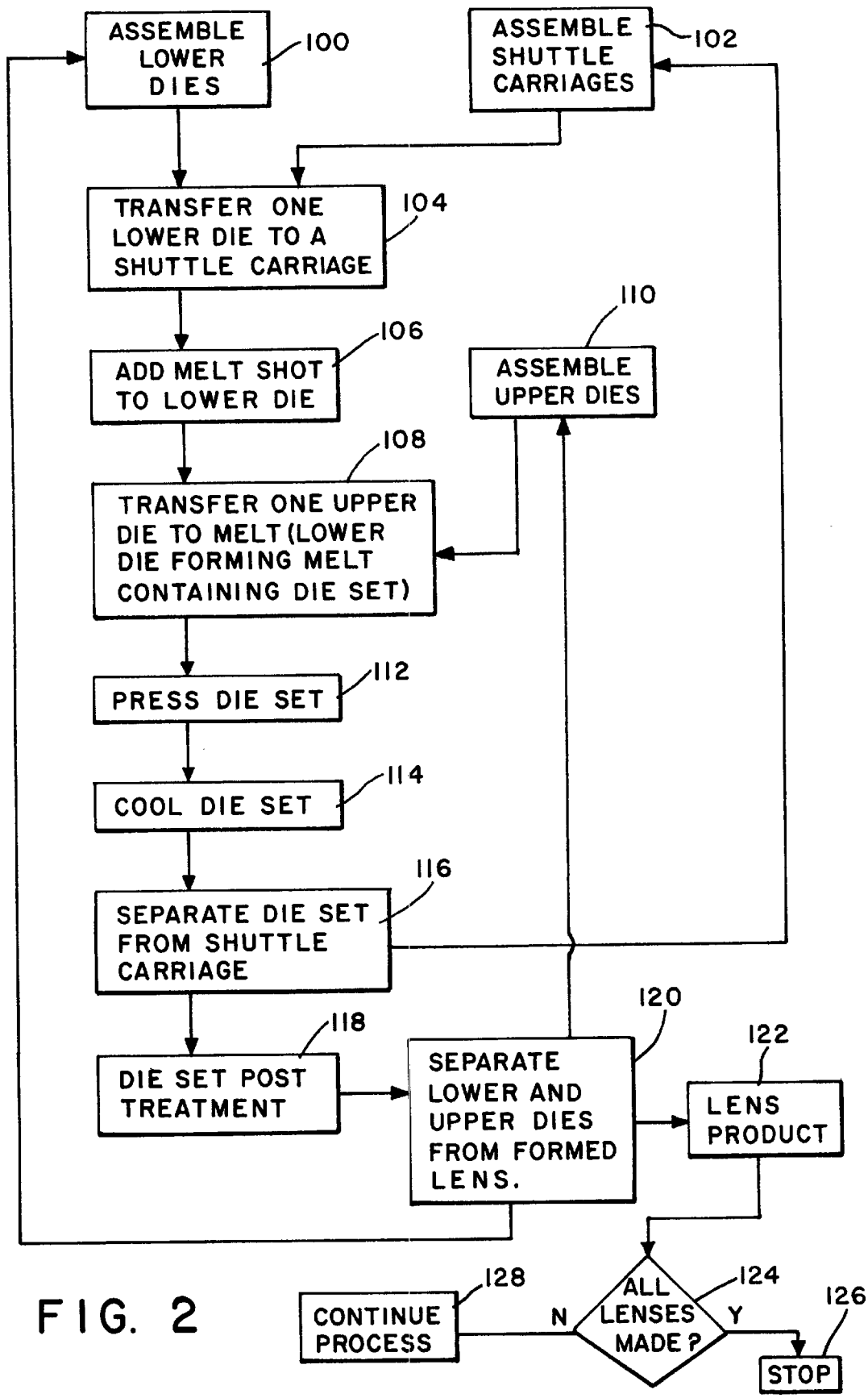
FIG. 2 is a flow sheet of a method of the invention used to make optical lenses.

Referring to FIG. 2, a method of the invention showing processing of sequential die sets may be shown. A plurality of lower dies are assembled in step 100 and a plurality of shuttle carriages assembled in step 102. One lower die is transferred to a shuttle carriage in step 104. A melt shot from an extruder is fed onto the lower die surface positioned in the shuttle carriage in step 106. An upper die in step 108 is then transferred to the melt/lower die on the shuttle carriage forming a die set containing the melt therebetween in step 108. The melt containing die set is pressed in step 112. The melt containing die set is then cooled in step 114 and the melt containing (now a solidified article) die set separated from the shuttle carriage in step 116. Separated shuttle carriages from step 116 are recycled to step 102 where shuttle carriages are assembled for future use. The separated article containing die set is then post-treated in step 118. After post-treatment, the lower die and upper die are separated from the formed lens in step 120. The lens product is then stored in step 122. The separated lower die is recycled to step 100 and separated upper die recycled to step 110. The sequence is repeated for each sequential die set processed in the method of the invention until all the lens products are made as determined by step 124. If all lenses are made, the process is stopped in step 126. If more lenses are to be made, the process is continued in step 128.

Various embodiments of the present invention will now be illustrated by reference to the following specific examples. It is to be understood, however, that such examples are presented for purposes of illustration only, and the present inventions in no way to be deemed as limited thereby.

EXAMPLE 1

Polystyrene lenses having negative prescription power were molded using the E-C molding process of the invention. Chevron Polystyrene MC 3700 pellets were used to form an extruded melt. The extruder was a Leistritz ZSE-27 twin screw intermeshing counter-rotate extruder with L/D of 40:1. Barrel 8 was a devolatilization zone. The extruder barrel temperatures were set at:

| Barrel Zone | 1 | 2 | 3 | 4 | 5 | 6 | 7 | 8 | 9 | 10 |
|---|---|---|---|---|---|---|---|---|---|---|
| Temperature (° C.) | NH* | 202 | 202 | 202 | 230 | 230 | 240 | 245 | 245 | 245 |

*NH: no heating, barrel 1 was used to feed the plastic pellets using a solid feeder.

The discharge die was a ½" round strand die. The temperature of the strand extrudate was controlled at 245° C. Screw speed was 150 rpm at a torque of 25%. Melt temperature was 245–250° C. The shuttle carriage and die temperature was 160° C. The flow rate of the melt from the extruder was 14 lb/hour. The time for collecting a shot of melt into the shuttle carriage onto the surface of the lower die was about 8 sec. The distance between the end of the vertical falling melt extrudate and top of the lower die was about 3 inch. 80 mm diameter glass upper and lower dies were used. The dies were cleaned in distilled water and dried in an oven at 100° C. over 3 hours. The press pressure was about 25 psi. The thickness of the lens was controlled by a mechanical spacer which stops the downward movement of the press head when a pre-set position is reached. The time period for holding the die in the final pressed position was 6 sec. The die set containing the formed lens was taken out of the shuttle carriage and left at room temperature to cool. After about 10 min., the lens released from the glass die set. The surface feature of the glass die copied very well onto the molded lens surfaces. Under a polarizer, there was no stress induced birefringence. The surface of the lens had very good optical quality without knit lines and flow lines. The optical quality of the lens was commercially acceptable.

EXAMPLE 2

Acrylic lenses having negative prescription power were molded using the E-C molding process of the invention. AtoHass North America Plexiglas DR-101 (PMMA) pellets were used to form an extruded melt. The extruder was a Leistritz ZSE-27 twin screw intermeshing counter-rotate extruder with LID of 40:1. Barrel 8 was a devolatilization zone. The extruder barrel temperatures were set at:

| Barrel Zone | 1 | 2 | 3 | 4 | 5 | 6 | 7 | 8 | 9 | 10 |
|---|---|---|---|---|---|---|---|---|---|---|
| Temperature (° C.) | NH* | 210 | 230 | 235 | 235 | 240 | 240 | 255 | 255 | 255 |

*NH: no heating, barrel 1 was used to feed the plastic pellets using a solid feeder.

The extru0der discharge die was a round ½" diameter strand. The temperature of the melt extrudate was controlled at 260° C. Screw speed was 150 rpm at a torque of 47%. Melt temperature was 258° C. The shuttle carriage and die set temperature was 230° C. The flow rate of the extruder was 14 lb/hour. The time for collecting a shot of melt into the shuttle carriage onto the surface of the lower die was 8 sec. The distance between the end of the vertical falling melt extrudate and top of the lower die was about 4 inch. 80 mm diameter upper and lower glass die sets were used. The press pressure was about 30 psi. The time period for holding the die in the pressed position was 6 sec. The die set containing the formed lens was taken out of the shuttle carriage and left at room temperature to cool. After about 10 min., the lens released from the glass die. The surface feature of the glass die copied very well onto the molded lens surfaces. Under a polarizer, there was no stress induced birefringence. The surface of the lens had very good optical quality without knit lines and flow lines. The lens was commercially acceptable.

EXAMPLE 3

Thiourethane-urethane copolymer lenses having negative prescription power were molded using the E-C molding process. A reactor extrudes process as shown in U.S. Pat. No. 5,679,756 supra was used to form the copolymer. The extruder was a Leistritz ZSE-27 twin screw intermeshing counter-rotate extruder with L/D of 40:1. Barrel 8 was a devolatilization zone. The extruder barrel temperatures were set at:

| Barrel Zone | 1 | 2 | 3 | 4 | 5 | 6 | 7 | 8 | 9 | 10 |
|---|---|---|---|---|---|---|---|---|---|---|
| Temperature (° C.) | NH* | 155 | 168 | 170 | 167 | 167 | 167 | 167 | 160 | 160 |

*NH: no heating, barrel 1 was used to feed the plastic pellets using a solid feeder.

The main feeding port was a static mixer pre-reactor. The pre-reactor produces 5.7 lb/hour thiourethane prepolymer which was fed continuously into the main feeding port at barrel 1. Monomer liquid MDI was fed at a rate of 1.84 lb/hour into the extruder at barrel 3 through an injector using a metering pump manufactured by Eldex. Diol monomer (cyclohexanedimethanol) was fed at a rate of 0.94 lb/hour into the extruder at barrel 4 through an injector using a Cole Parmer metering gear pump. The monomers and the prepolymer reacted in the extruder. The extruder discharge die was a ½" round strand die. The temperature was controlled at 160° C. Screw speed was 190 rpm at a torque of 33%. Melt temperature was 180° C. The shuttle carriage die temperature was 160° C. The total flow rate of the extruder was 8.5 lb/hour. The time for collecting a shot of melt onto the surface of the lower die in the shuttle carriage was 10 sec. The distance between the end of the vertically falling melt extrudate and top of the lower die was about 3 inch. 80 mm diameter upper and lower glass dies were used, and the glass die surface was pre-treated with dichlorodimethylsilane surfactant. The glass dies were first cleaned and dried. The press pressure was about ca. 20 psi. The time period for holding the die in the final pressed position was 6 sec.

The lens containing die set was taken out of the shuttle carriage and placed in an oven at 125° C. with nitrogen atmosphere for 24 hours annealing. The lens containing die sets were then cooled at room temperature for about 10 min. and the lens released from the glass die set. The surface feature of the glass die copied very well onto the molded lens. Under a polarizer, there was no stress induced birefringence. The surface of the lens had very good optical quality without knit lines and flow lines. The impact strength of the lens was greatly improved after the annealing. A lens made using the method of the invention with 1.0 mm center thickness passes Industrial standard impact test of ANSI87.1-1989, 15.5.2. and streetwear impact test standard FDA 21 CFR 801.410. The lenses were commercially acceptable.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method of forming an optical article comprising:

forming a melt of an optical polymeric material in a melting apparatus and feeding the melt from the apparatus in the form of an unpressurized melt strand;

providing a lower die from a lower die supply device, the lower die being part of a die set comprising a lower die and an upper die;

forming and adding a predetermined melt shot portion of the unpressurized melt strand to the upper surface of the lower die;

providing the upper die from an upper die supply device and positioning the upper die on top of the unpressurized melt shot containing lower die forming a melt containing die set;

compressing the melt containing die set forming an optical article;

removing the optical article from the die set; and repeating the above steps until the desired number of optical articles are made.

2. The method of claim 1 wherein the melt is formed in an extruder which provides a continuous melt feed to a series of sequential lower dies used to make the optical articles.

3. The method of claim 2 wherein the lower die is transported in a shuttle carriage through the steps of the method.

4. The method of claim 3 wherein the melt containing lower die is advanced in the carriage and the upper die supplied and positioned on the melt containing lower die.

5. The method of claim 4 wherein the melt containing die set is compressed forming the optical article.

6. The method of claim 1 wherein the lower die is heated.

7. The method of claim 6 wherein the upper die is heated.

8. The method of claim 3 wherein the shuttle carriage is heated.

9. The method of claim 1 wherein the optical polymeric material is in the form of pellets.

10. The method of claim 1 wherein the melt is formed in an extruder.

11. The method of claim 1 wherein the melt is formed in a reaction extruder.

12. The method of claim 1 wherein the lower die and upper die are glass.

13. The method of claim 1 wherein the die set is compressed at a pressure of about 10 to 500 psi.

14. The method of claim 1 wherein the melt shot portion added to the lower die is cylindrical in shape.

15. An apparatus for making optical articles comprising:

melting means for forming a melt of an optical polymeric material and feeding the melt from the melting means in the form of an unpressurized melt strand;

lower die supply means for supplying a lower die to receive a portion of the melt strand;

melt supply means for feeding the unpressurized melt strand to the upper surface of the lower die and forming the unpressurized melt strand into a predetermined unpressurized melt shot portion;

upper die supply means for supplying an upper die and positioning the upper die on top of the unpressurized melt shot containing lower die forming a melt containing die set;

compression means for compressing the melt containing die set to form the optical article;

separating means for separating the formed optical article from the upper die and lower die; and recycling means to transport the lower die and upper die to their respective supply means.

16. The apparatus of claim 15 wherein the melting means is an extruder.

17. The apparatus of claim 15 wherein the melting means is a reaction extruder.

18. The apparatus of claim 15 wherein the lower die and upper die are glass.

19. The apparatus of claim 15 wherein the lower die and upper die are transported through the apparatus in a shuttle carriage.

20. The apparatus of claim 15 wherein the lower die and upper die are both heated.

21. The apparatus of claim 19 wherein the shuttle carriage is heated.

22. The method of claim 14 wherein the unpressurized melt strand is falling vertically from the melting apparatus and is used to form the unpressurized melt shot.

23. The method of claim 22 wherein the melting apparatus is an extruder.

24. The apparatus of claim 15 wherein the unpressurized melt strand is cylindrical.

25. The apparatus of claim 24 wherein the unpressurized melt strand is fed from the melting means by falling vertically from the melting means.

26. The apparatus of claim 25 wherein the melting means is an extruder.

* * * * *

UNITED STATES PATENT AND TRADEMARK OFFICE
CERTIFICATE OF CORRECTION

PATENT NO. : 6,015,512
DATED : January 18, 2000
INVENTOR(S) : Yang et al.

It is certified that error appears in the above-identified patent and that said Letters Patent is hereby corrected as shown below:

In column 6, line 20, delete "100°C" and substitute therefor -- 10°C --.

In column 9, line 34, delete "LID" and substitute therefor -- L/D --.

In column 9, line 44, delete "extru0der" and substitute therefor -- extruder --.

Signed and Sealed this

Twenty-third Day of January, 2001

Attest:

Q. TODD DICKINSON

*Attesting Officer*                *Commissioner of Patents and Trademarks*